Patented Jan. 12, 1954

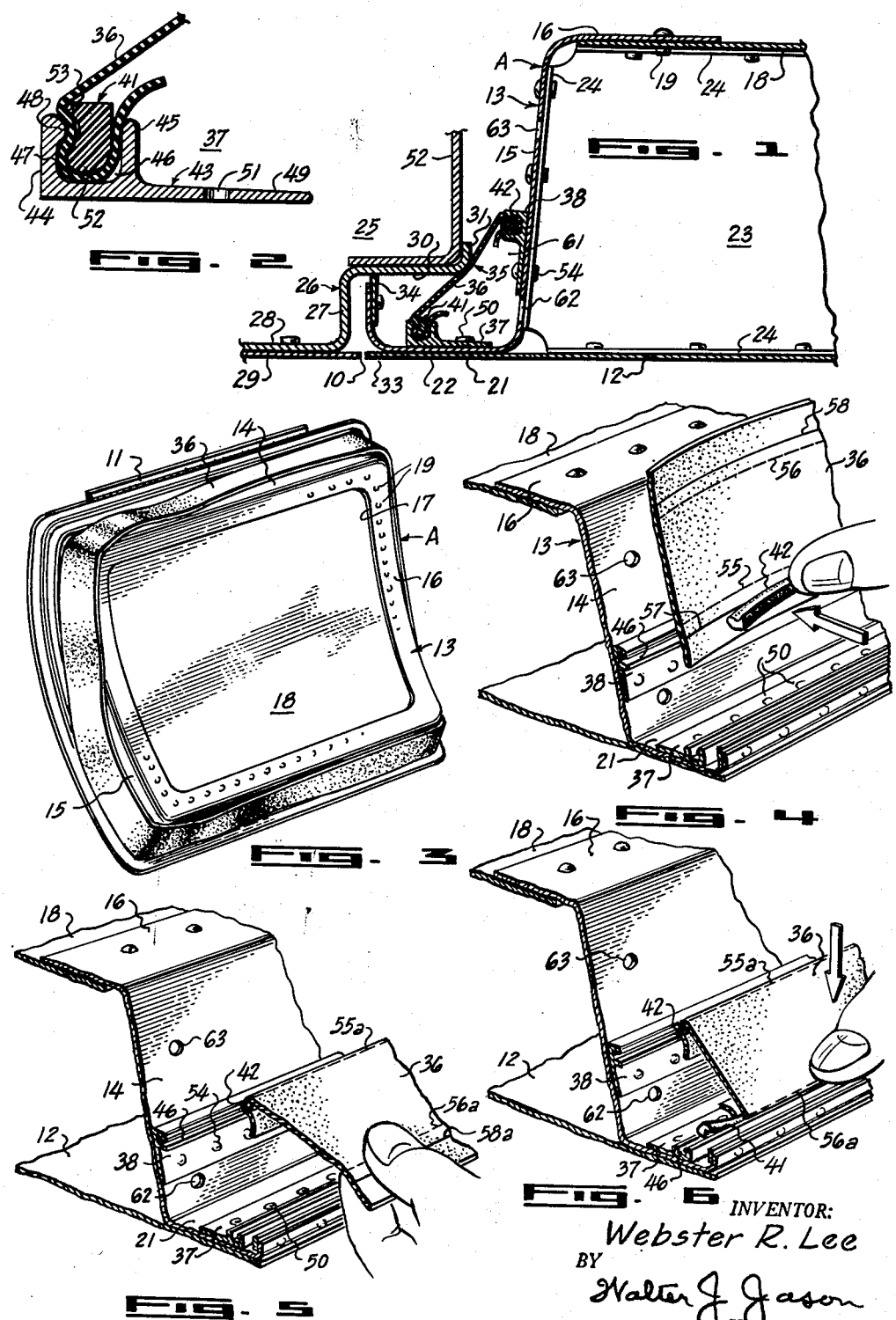

2,665,459

UNITED STATES PATENT OFFICE 2,665,459

CLOSURE SEAL

Webster R. Lee, La Mesa, Calif., assignor to Consolidated Vultee Aircraft Corporation, San Diego, Calif., a corporation of Delaware Application March 20, 1952, Serial No. 277,695

9 Claims. (Cl. 20—69)

The present invention relates to sealing arrangements and more particularly to an improved seal for a closure or door intended to close the opening to a pressurized area such as the cabin of an airplane.

An object of the present invention is to provide a novel form of seal construction mounted in outlining relation to a closure member and which serves effectively to seal the closure member within its frame to prevent escape of air from or entrance of air to the area being sealed.

Another object of the invention is to provide a door seal of improved design which will effectively perform its required function regardless of frame or fuselage variations or deflections.

Another object of the invention is to provide a novel method of readily mounting a sealing diaphragm to a door about the periphery thereof.

A further object of the invention resides in the provision of a sealing construction for a closure member wherein a sealing diaphragm conforming generally in outline to the outline of the closure member is locked or secured in place at its longitudinal edges in a novel fashion.

A still further object of the invention is to provide a seal for a closure member which is effectively supported adjacent the edges thereof in a simplified, effective and economical manner.

Other objects and features of the present invention will be readily apparent to those skilled in the art from the following description and the appended drawings in which:

Figure 1 is a sectional view of a closure member having mounted thereon a seal in accordance with the present invention.

Figure 2 is a sectional view of a detail illustrating an attaching device.

Figure 3 is a perspective view illustrating the first step in applying a seal to a door.

Figures 4, 5 and 6 illustrate the other steps in the mounting of the seal.

Having reference now in detail to the drawings, there is shown in Figure 1 a typical door or closure member indicated generally by the letter A, for closing an opening 10 in a pressurized structure, such as the cabin of an airplane. The particular means for mounting and holding the door 10 in place forms no part of the present invention, and it is understood that any usual and conventional devices, such as a hinge 11 and retractable door latching bolts (not shown) may be utilized.

Illustrative door A may assume a construction best shown in Figures 1 and 3. As there illustrated, the door A is of generally rectangular configuration and embodies a door panel 12 upon the interior surface of which is mounted a generally rectangular shell member 13 having a through opening and having side walls 14 and end walls 15. The side walls 14 and end walls 15 are formed with a continuous flange 16 extending inwardly in surrounding relationship to the opening 17 at the top of shell 13. An inner panel 18 is applied to shell 13 in overlapping relation to flange 16 to close opening 17, and is suitably secured to the flanges by a plurality of rivets 19.

Side walls 14 and end walls 15 also have formed integral therewith outwardly directed continuous peripheral flange 21 adapted to overlie a peripheral platform portion 22 of the outer door panel 12. A plurality of rivets secure flange 21 to the inner face of the door panel 12 and thereby mount the shell 13 to door panel 12.

Conventional brace members may be included within shell 13 for structural support. Figure 1 illustrates one such brace member, indicated generally at 23, which embodies inturned flanges 24 at its edges by means of which the brace member 23 may be riveted to the walls 14 and 15 and to the inner and outer door panels 18 and 12.

Door A cooperates with a frame assembly 25 which surrounds opening 10 to be closed by door A. Frame assembly 25 comprises a bracket member 26 having a web 27 with a flange 28 overlying and riveted to the panel or wall 29 of the structure which carries door A, and a second flange 30 oppositely directed to flange 28 and projecting toward door A to effect a jamb portion. The outer end of flange 30 is bent to form a rounded portion as at 31. A structural member 52 is secured, as by welding to the inner face of flange 30.

Projecting flange 30 in cooperation with peripheral flange 21 of shell 13 is adapted to determine the position of door A and the extent of its projection into opening 10. Peripheral flange 21 of shell 13 has its outer end bent inwardly as at 33 and carries a plate member 34 which is adapted to engage the projecting flange 30 of frame 25 thereby to locate door A properly relative to its supporting structure. The plate member 34 is so dimensioned as to assure that the exterior surface of outer door panel 12 will be faired into exterior surface of the panel or wall 29.

Supported by door A in surrounding relationship to the shell member 13 is a sealing assembly 35 comprising a peripheral continuous flexible band or diaphragm 36 positioned for engagement by the rounded portion 31 of flange 30 to effect a seal when door A is moved into its closed position. The particular material of which the band or diaphragm 36 is composed forms no part of the present invention as it is contemplated that it may be made of any usual flexible, elastic material, such as rubber, synthetic rubber, plastic, or the like.

To mount diaphragm 36 in sealing position, there is provided a pair of supporting fixtures 37 and 38 and a pair of attachment inserts or clamping elements 41 and 42, one for cooperation with each fixture.

The supporting fixtures 37 and 38 are mounted on the door 10 generally at right angles to one another with supporting fixtures 37 positioned on peripheral flange 21 of shell 13 and fixture 38 located on the side and end walls 14 and 15 of the shell member 13.

Supporting fixtures 37 and 38 may be formed of metal or of any other suitable material having substantial rigidity. Aluminum is a preferred material because of its structural qualities, adaptability to being worked, and non-corrosive characteristics. They may be formed into the desired shape by any usual manufacturing method, though, it has been found that the desired design is readily and economically obtained by extrusion. Fixtures 37 and 38 are similar in their construction, and Figure 2 illustrates in cross-section the preferred form. As shown each fixture embodies an integral base 43 having a pair of upstanding walls 44 and 45 thereon which are spaced to define a groove or mounting channel 46 therebetween. Wall 44 located at the outer edge of base 43 is undercut as at 47 and is formed with a rounded projecting portion 48 which extends toward the opposite wall 45 to overlie channel 46. Base 43 is provided with an outwardly extending mounting flange 49 normal to wall 43. Perforations 51 are provided in flange 49 for accommodating rivets by means of which the fixtures may be mounted to their supports.

Inserts 41 and 42 which fit into mounting channels 46 of fixtures 37 and 38 are of integral construction and preferably assume a configuration shown in cross-section in Figure 2. Each insert embodies a bulge portion 52 adapted to underlie projection 48 of wall 44, and each includes a projection 53 which will overlie wall projection 48. Inserts 41 and 42 may be formed of metal or any usual material of sufficient strength to withstand clamping pressure so as not to be compressed into a shape which would allow the inserts to slip or withdraw from the channels 46. Aluminum is a preferred material because it is relatively inexpensive and easily formed into the desired shape.

Each fixture 37 and 38 and insert 41 and 42 is preferably extruded or otherwise formed in one piece and the fixtures are mounted upon door 10 as single pieces, with fixture 38 being held to side and end walls 14 and 15 of shell 13 by suitable rivets 54 and fixture 37 being secured to flange 21 of walls 14 and 15 by rivets 50 which hold shell flange 21 upon the peripheral platform portion 22 of door panel 12. Fixtures 37 and 38 are affixed upon their supports with their mounting flanges 49 each extending toward the juncture of flange 21 with shell walls 14 and 15. This properly locates fixture projections 48 for clamping cooperation with inserts 41 and 42. It is noted that mounting channels 46 of the fixtures open generally in the direction of door frame 25 but generally at right angles to one another.

While it has been stated that the fixtures 37 and 38 and the inserts 41 and 42 are preferably utilized in single lengths, this is merely because mounting single lengths is easier. Obviously, if desired, these various elements could be employed as a plurality of strips and the fixtures 37 and 38 would then be secured to the door 10 with their ends in abutment. And as many lengths of inserts 41 and 42 would then be worked into channels 46 as necessary to substantially fill them.

Diaphragm 36, which is adapted to be held upon door 10 by the fixtures 37 and 38 and inserts 41 and 42, is preferably formed as a continuous band, and of a length which will permit it to be fitted closely about the perimeter of shell 13. To assist in mounting diaphragm 36 to door 10 and to assure correct installation thereon two pairs of lines are provided on each of the inner and outer surfaces of diaphragm 36. These lines run the length of the diaphragm and each line of a pair is differently colored than its mate, for example, one line of a pair may be colored red and the other line yellow. Figure 4 illustrates two pairs of lines applied on the interior surface of diaphragm 36. The two innermost lines, located from the longitudinal edges of diaphragm 36, are designated by the numerals 55 and 56, and those lines which lie closer to the longitudinal edges are numbered 57 and 58. As stated hereinbefore, two pairs of longitudinal lines are also provided on the exterior surface of diaphragm 36. The innermost lines, are identified in Figures 5 and 6 by the numerals 55a and 56a. Only one outermost line, 58a, is shown in the drawings, in Figure 5. The innermost lines 55a and 56a may be colored yellow while the outermost lines may be colored red. The spacing between lines 55a and 56a is determined by the distance between channels 46 of fixtures 37 and 38 and the amount of tension desired to be provided diaphragm 36 when it is in supported position upon fixtures 37 and 38.

The mounting of diaphragm 36 to fixtures 37 and 38 and the manner in which the various pairs of lines provided on the diaphragm 36 are utilized in the mounting process will now be described.

The diaphragm 36 will be placed first upon the shell 13, as shown in Figure 3, being stretched about the perimeter thereof. It will then be secured to fixtures 37 and 38, being affixed first to inboard fixture 38 which is carried upon the perimeter of shell 13. Insert 42 which cooperates with fixture 38 is placed upon diaphragm 36 and is then fitted into mounting channel 46 of fixture 38 with a rolling and pressing movement to carry bulge portion 52 of the insert beneath the projection 48 and thereby dispose a portion of the diaphragm 36 within channel 46. It is understood that the dimensions of insert 42 and the channel 46 are such that the latter can accommodate the former together with the material of diaphragm 36. The pair of interior lines 55 and 57 afforded near the lower longitudinal edge of diaphragm 36 serve as a guide when working insert 42 into its cooperating channel 46, as shown in Figure 4, to prevent diaphragm 36 being mounted cocked or askew relative to fixture 38. After insert 42 has been pressed into place around the entire periphery of shell 13 the free, or upper, longitudinal edge of the diaphragm 36 is grasped and diaphragm 36 folded down to extend it over the top of insert 42 and channel 46, as illustrated in Figure 5. At this time, the exterior surface of diaphragm 36 is examined to determine if only innermost line 55a, which for convenience of observation and distinction between lines may be colored yellow, is visible. If only the yellow line were visible, it would signify proper installation. However, if the outermost line 58a, which may be colored red, is also visible the mechanic is warned that diaphragm 36, when finally assembled will not be properly tensioned. If the red line 58a is visible, the insert 42 is removed from its channel 46 and diaphragm 36 released. The mounting process is repeated until only the yellow line 55a is visible. When this condition exists, the free edge of diaphragm 36 is folded around insert 41 to a point where the other innermost, or yellow, line 56a will be positioned along the edge of projection 53 of the insert. The entire length of enfolded insert 41 will then be pressed into channel 46 of retaining fixture 37, as shown in Figure 6, thereby to complete the mounting of diaphragm 36 to door 10.

Mounting of diaphragm 36 under tension results in a force being applied to each insert 41 and 42 at the projections 53 thereof and in a direction which will cause bulge portions 52 of the inserts to lock beneath projections 48 of walls 44 thereby to apply clamping forces upon the material interposed between bulge portions 52 and projections 48 to maintain diaphragm 36 secured to fixtures 37 and 38.

Diaphragm 36 in mounted position is adapted, when door 10 is moved to closed position, to be engaged by rounded portion 31 of flange 30 of frame 25 to effect a seal around the door.

Diaphragm 36 in mounted position forms, with the door structure therebeneath, an enclosed chamber designated generally in the drawings by the numeral 61. As shown, a plurality of vent holes 62 afford communication between chamber 61 and the interior of door shell 13. Other vent holes 63 provide communication between the interior of door shell 13 and the interior of the cabin or enclosure being sealed. The pressure within chamber 61 will therefore always be the pressure existing within the cabin or enclosure carrying door 10. This serves to maintain the diaphragm 36 in an inflated condition thereby to increase the effectiveness of the seal at the juncture of rounded portion 31 with diaphragm 36.

It is noted that the area of contact afforded by diaphragm 36 to rounded portion 31 is substantial, thereby permitting an effective seal to be established even though some frame or fuselage variations or deflections may be present or be developed.

While a certain preferred embodiment of the invention has been specifically disclosed, it is understood that the invention is not limited thereto as variations will be readily apparent to those skilled in the art and the invention is to be given its broadest possible interpretation within the terms of the following claims.

What I claim is:

1. A sealing arrangement for a door and an associated structure having a door opening comprising: a frame supported on said structure in surrounding relationship to said door opening having a projecting portion, a flexible, resilient diaphragm, means for supporting said diaphragm at its longitudinal edges upon said door for engagement by said frame projecting portion on closure of the door to effect a continuous seal about the door, said supporting means comprising a pair of peripheral fixtures mounted on said door angularly relative to one another, said fixtures each defining an outwardly opening channel, and a pair of attachment inserts for enwrapment by the longitudinal edges of said diaphragm each adapted to fit within a channel in a fixture to hold said diaphragm in a state of initial tension.

2. A sealing arrangement for a door and an associated structure having a door opening comprising: a frame supported on said structure in surrounding relationship to said door opening having a projecting peripheral portion, an endless band of flexible, resilient material, means for supporting said band at its longitudinal edges peripherally to said door for engagement by said peripheral frame projecting portion on closure of the door to effect a continuous seal about the door, said means comprising a pair of peripheral fixtures mounted on portions of said door which are generally at right angles, said fixtures each having a mounting flange fixedly secured to an outwardly opening door portion and each defining a channel, and a pair of attachment inserts for enwrapment by the longitudinal edges of said band, each insert adapted to fit within a channel in a fixture to hold said band in a state of initial tension.

3. The combination with a structure having a wall with an aperture therein and a closure for said aperture, said closure comprising an exterior panel and a member having side and end walls mounted on the interior surface of said exterior panel and spaced from the edges of said panel to provide a peripheral portion of a frame supported on said structure in surrounding relationship to said aperture having a peripheral projecting portion, a flexible, resilient diaphragm, means for supporting said diaphragm at its longitudinal edges upon said closure for engagement by said frame projecting portion to effect a continuous seal about the closure, said means comprising a pair of peripheral fixtures, one of said fixtures mounted on the side and end walls of said closure member and the other mounted angularly to the first on said closure platform portion, said fixtures each defining an outwardly opening channel, and a pair of attachment inserts for enwrapment by the longitudinal edges of said diaphragm each adapted to fit within a channel in a fixture to hold said diaphragm in a state of initial tension.

4. A sealing arrangement for a door and an associated structure having a door opening comprising: a frame supported on said structure in surrounding relationship to said door opening having a peripheral projecting portion, a flexible, resilient diaphragm, means for supporting said diaphragm at its longitudinal edges upon said door for engagement by said frame projecting portion on closure of the door to effect a continuous seal about the door, said means comprising a pair of peripheral fixtures mounted on said door angularly relative to one another, said fixtures each defining a channel, and a pair of attachment inserts for enwrapment by the longitudinal edges of said diaphragm each adapted to fit within an outwardly opening channel in an attachment means to hold said diaphragm in a state of initial tension, said diaphragm in mounted position effecting a chamber therebeneath, and a vent providing communication between said chamber and the interior of said structure having the door opening.

5. The combination with a door and structure having a wall with an aperture closable by said door, said door having an exterior panel and a member on the interior surface of said panel, which member has side and end walls angularly disposed to said interior surface and spaced from the edges of said panel whereby a peripheral platform portion is provided on said door, of a frame supported on said structure in surrounding relationship to said door opening having a peripheral portion projecting in the direction of said side and end walls on said door, a continuous band of flexible, resilient material, means for supporting said band at its longitudinal edges upon said side and end walls on said door for engagement by said frame projecting portion on closure of the door to effect a continuous seal about the door, said means comprising a pair of peripheral fixtures, one of which is fixedly supported on said side and end walls and the other of which is mounted on said door platform portion, said fixtures each defining an outwardly opening channel, and a pair of attachment inserts for enwrapment by the longitudinal edges of said band, each insert adapted to fit within a channel in a fixture to hold said band in a state of initial tension.

6. The combination with a door and structure having a wall with an aperture closable by said door, said door having an exterior panel and a member on the interior surface of said panel, which member has side and end walls angularly disposed to said interior surface and spaced from the edges of said panel whereby a peripheral platform portion is provided on said door, of a frame supported on said structure in surrounding relationship to said door opening having a peripheral portion projecting in the direction of said side and end walls on said door, a continuous band of flexible, resilient material, means for supporting said band at its longitudinal edges upon said side and end walls on said door for engagement by said frame projecting portion on closure of the door to effect a continuous seal about the door, said means comprising a pair of peripheral fixtures, one of which is fixedly supported on said side and end walls and the other of which is mounted on said door platform portion, said fixtures each defining an outwardly opening channel, and a pair of attachment inserts for enwrapment by the longitudinal edges of said band, each insert adapted to fit within a channel in a fixture to hold said band in a state of initial tension, said band in mounted position defining a peripheral chamber therebeneath, and openings through said member on the interior of said door panel affording communication between the interior of the structure carrying the door and said chamber beneath said band.

7. A sealing arrangement for a door and an associated structure having a door opening comprising: a frame supported on said structure in surrounding relationship to said door opening having a projecting portion, a flexible, resilient diaphragm, means for supporting said diaphragm at its longitudinal edges upon said door for engagement by said frame projecting portion on closure of the door to effect a continuous seal about the door, said supporting means comprising a pair of peripheral fixtures mounted on said door angularly relative to one another, said fixtures each defining an outwardly opening channel, and a pair of attachment inserts for enwrapment by the longitudinal edges of said diaphragm each adapted to fit within a channel in a fixture to hold said diaphragm in a state of initial tension, and markings on said diaphragm for determining the amount of enwrapment of said longitudinal edges of said diaphragm.

8. A sealing arrangement for a door and an associated structure having a door opening comprising: a frame supported on said structure in surrounding relationship to said door opening having a projecting peripheral portion, an endless band of flexible, resilient material, means for supporting said band at its longitudinal edges peripherally to said door for engagement by said peripheral frame projecting portion on closure of the door to effect a continuous seal about the door, said means comprising a pair of peripheral fixtures mounted on portions of said door which are generally at right angles, said fixtures each having a mounting flange fixedly secured to an outwardly opening door portion and each defining a channel, and a pair of attachment inserts for enwrapment by the longitudinal edges of said band, each insert adapted to fit within a channel in a fixture to hold said band in a state of initial tension, and markings comprising longitudinally extending lines on said band for determining the amount of enwrapment of the longitudinal edges of said band about said inserts.

9. The combination with a structure having a wall with an aperture therein and a closure for said aperture, said closure comprising an exterior panel and a member having side and end walls mounted on the interior surface of said exterior panel and spaced from the edges of said panel to provide a peripheral portion of a frame supported on said structure in surrounding relationship to said aperture having a peripheral projecting portion, a flexible, resilient diaphragm, means for supporting said diaphragm at its longitudinal edges upon said closure for engagement by said frame projecting portion to effect a continuous seal about the closure, said means comprising a pair of peripheral fixtures, one of said fixtures mounted on the side and end walls of said closure member and the other mounted angularly to the first on said closure platform portion, said fixtures each defining an outwardly opening channel, and a pair of attachment inserts for enwrapment by the longitudinal edges of said diaphragm each adapted to fit within a channel in a fixture to hold said diaphragm in a state of initial tension, and markings on said diaphragm for determining the extent of enwrapment of the longitudinal edges of said diaphragm about said inserts, said markings comprising a series of laterally spaced, longitudinally extending lines.

WEBSTER R. LEE.

References Cited in the file of this patent

UNITED STATES PATENTS

| Number | Name | Date |
| --- | --- | --- |
| 2,560,665 | Stark | July 17, 1951 |

FOREIGN PATENTS

| Number | Country | Date |
| --- | --- | --- |
| 484,095 | Germany | Oct. 10, 1929 |